Feb. 6, 1951 W. G. GRIMES 2,540,942
VARIABLE FRICTION GEARING
Filed Jan. 27, 1948 2 Sheets-Sheet 1

INVENTOR.
WARREN G. GRIMES
BY Gustave Miller
ATTORNEY.

INVENTOR.
WARREN G. GRIMES
BY Gustav Miller
ATTORNEY.

Patented Feb. 6, 1951

2,540,942

UNITED STATES PATENT OFFICE 2,540,942

VARIABLE FRICTION GEARING

Warren G. Grimes, Urbana, Ohio

Application January 27, 1948, Serial No. 4,500

1 Claim. (Cl. 74—200)

This invention relates to a navigation meter, and has for an object to provide a meter to assist the pilot of an aircraft in checking his location in flight and to tell him how far he has progressed in flight. It is used in connection with a map or chart showing the intended course of the flight, and more particularly, is intended for use in connection with a chart or map on which the flight course has been indicated by a piece of navigation tape or Transparent Map Tape disclosed and claimed in a copending application Ser. No. 649,288, filed February 21, 1946.

A further object of this invention is to provide a navigation meter which indicates the ground miles covered by the aircraft, and when the reading is checked against the corresponding figure on the navigation tape, gives the pilot his location on his aeronautical chart or map. While the meter of this invention may be used in connection with an aeronautical chart marked conventionally to indicate the course, the meter and the tape must be used together to obtain the best results, for the tape enables the pilot to read the distance on the chart of every check point along his course in relation to either or both his starting point and his destination, and avoids the necessity of measuring or calculating the distance between his starting point and any point along the course.

A further object of this invention is to provide a meter which may readily and easily be adjusted to continuously show the actual ground miles being covered during the flight.

A further object of this invention is to provide a navigation meter which may be readily brought into accurate adjustment with the actual ground miles covered by the first one or two check points observed at the beginning of the flight, and thereafter will continue to accurately measure the further ground miles covered so long as the weather and flight conditions remain constant.

With the foregoing and other objects in view, as will hereinafter become apparent, this invention comprises the combinations, constructions, and arrangement of parts hereinafter set forth, disclosed, claimed and illustrated in the accompanying drawings, wherein, Figure 1 is a plan view of the navigation meter of this invention.

Figure 1:
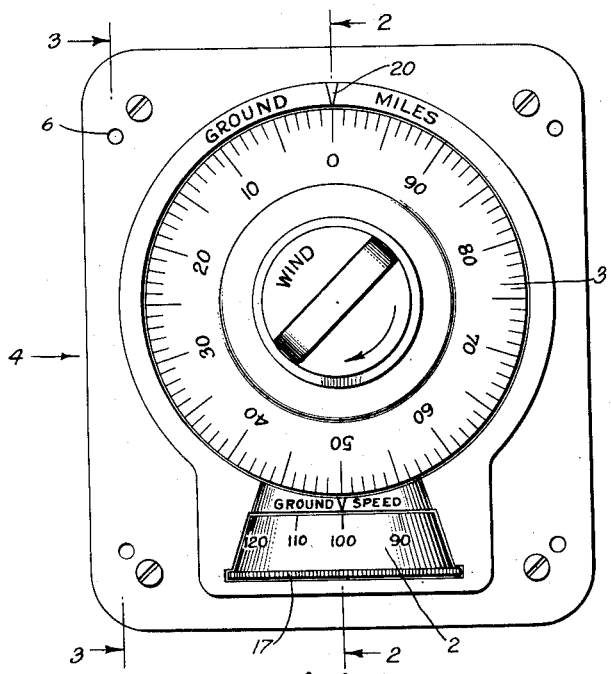

The navigation meter of this invention is housed in a case 5 which is of standard size and standard mounting hole spacings 6, the case being made of a plastic or metal material. The meter may be mounted either vertically or horizontally as convenient. A clock mechanism 7, mounted in the back of the case 5, is operable by a main-spring 8 which may be manually wound by means of the knob 1 mounted on the end of a shaft 9.

Figure 2:
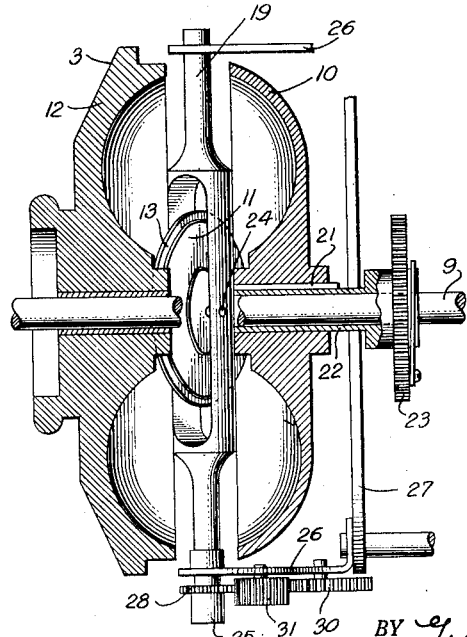
Figure 2 is a detail section on line 2—2 showing the variable speed transmission mechanism, on a larger scale.
Figure 3:
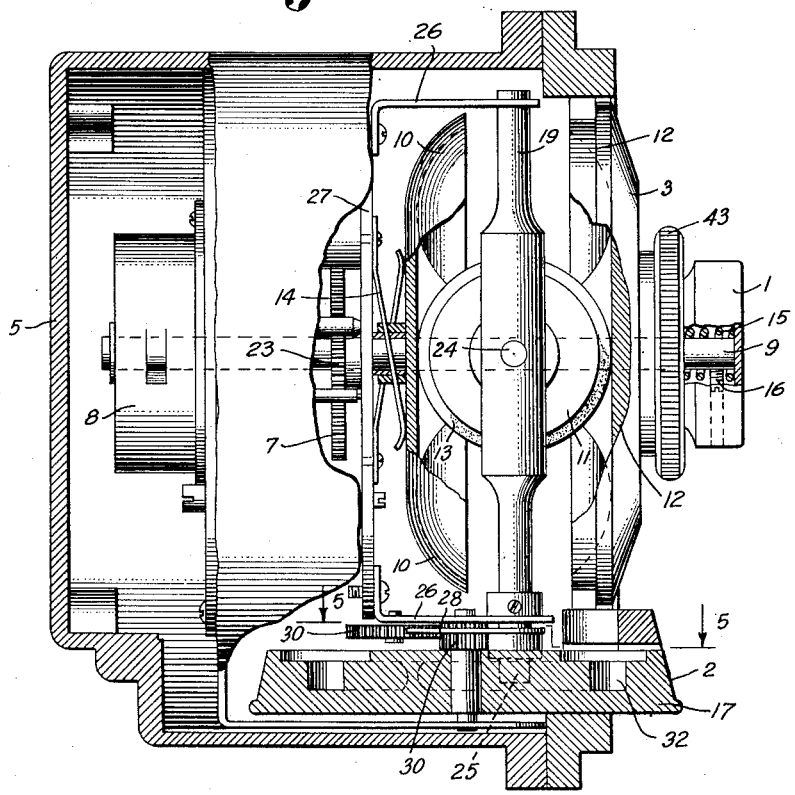
Figure 3 is a partly sectional view of the meter, the case housing the same being partly broken away, also on the larger scale.
Figure 4:
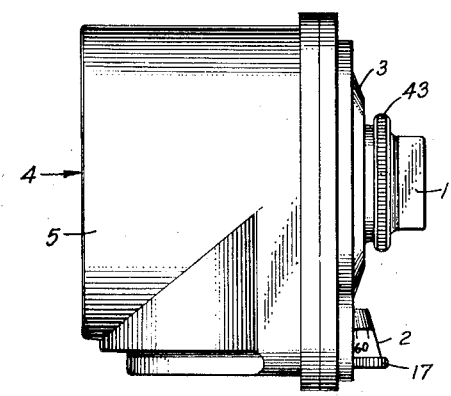
Figure 4 is a side view, on a smaller scale.
Figure 5:
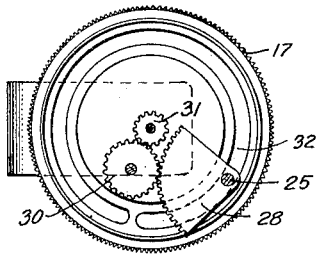
Figure 5 is a section on line 5—5 of Figure 3.

Supported on this shaft 9 is the variable speed transmission mechanism shown particularly in Figures 2 and 3. This mechanism includes a forward disk 12 whose outer face provides a dial 3 which is graduated with 100 divisions, appropriately marked, to indicate "ground miles" and the face of the case is correspondingly marked with an indicator point 20.

Also included in the variable speed transmission mechanism is the rear disk 10, and the roller 11 between the front disk 12 and the rear disk 10. The inner driving surfaces of the disks 10 and 12 are shaped like an annulus or the surface of a torus cut in half perpendicular to its axis. A rubber tire 13 is provided on the roller 11 and contacts the inner surfaces of the disks 10 and 12, and the disks 10 and 12 are held firmly against such rubber tire 13 by means of a rear set of leaf springs 14 and a front coil spring 15 located behind the winding knob 1. A screw 16 retains the winding knob 1 on the shaft 9, and thus holds the assembled disks 10 and 12 against the roller tire 13 and between the springs 14 and 15.

While the front disk 12 is freely journaled on the shaft 9, the rear disk 10 is keyed at 21 on a sleeve 22 integrally extending from or secured to the main gear 23 of the clock-mechanism 7, the gear 23 being freely journaled on shaft 9. Thus, operation of the clock-mechanism serves to rotate the rear disk 10, which, through rubber tire 13 on roller 11, also rotates the front disk 12 in a ratio depending on the angle of the roller 11 to the plane of the disks 10 and 12. When the roller is at right angles to the plane of the disks, the ratio of the drive between the disks is one-to-one. This ratio changes as the axis of the roller is changed, the outer disk rotating slower than the inner disk when the roller approaches the edge of the outer disk 12 and the center of the inner disk 10, and vice versa when the roller approaches the center of the outer disk 12 and the edge of the inner disk 10.

To control the rotation of the axis of the roller 11, it is journaled on a stub shaft 24 extending across a slot in a vertically mounted shaft 19 whose ends are pivoted through standards 26 secured on the clock-mechanism supporting plate 27. Keyed adjacent the lower end of the shaft 19 is a gear sector 28 meshing through an idler gear 30 with a control pinion 31 fixedly mounted centrally of the knurled wheel 17 whose rim provides a dial 2 bearing "ground speed" indicia thereon. The lower tip end 25 of vertical shaft 19 extends into an annular slot 32 extending slightly less than 360° about the upper surface of the wheel 17, correspondingly limiting its rotation.

It will be noted that the axis of the slotted shaft 19 coincides with the diameter of the roller 11 that is parallel to the plane between the disks 10 and 12 and is tangent to the circle defined by the center of the concentricity of the annular space between the disks. Hence, the peripheral surface of the roller always remains in contact with a point on the inner annular surface of each of the disks, and thus, rotation of the roller 11 caused by rotation of disks 10 causes corresponding rotation of the disk 12 in a ratio depending on the relative distance of the contact points from the center of rotation of the disks, i. e. from the axis of shaft 3.

In operation, the wheel 17 serves to control the driving ratio of one disk to the other by changing the direction of the axis of the roller 11, for as the roller 11 is pivoted by rotating the wheel 17 and dial 2, the driving radius of one disk increases as the other decreases thus varying the mutual speed of the disks. As the wheel 17 is rotated, the axis of roller 11 is altered, thus changing the speed of rotation of outer disk 12 on which is inscribed the "ground miles" dial 3. As the reading on the "ground speed" dial 2 is increased the rotating speed of the "ground miles" dial 3 is increased, and vice versa. Thus the "ground miles" dial 3 indicates the number of ground miles covered during any period for a particular speed setting on the "ground speed" dial 2. When the pilot sets out on his flight, he provides a chart or map 35 showing his starting point 36, as at Newark, Ohio, and his destination 37, as at Pittsburgh, Pennsylvania, with a piece of navigation tape 38 extending from the starting point to the point of destination. This navigation tape 38, as shown in the copending application above identified, is of transparent material having a tacky or adhesive surface on one side whereby it may be attached along the map or chart surface. A straight line 40 is printed along the center of the tape 38, and this line 40 is marked off with a scale corresponding to that of the map or chart 35. The scale is printed on the tape in the form of indicia lines 41 at right angles across the straight line 40 every tenth line being somewhat more prominent, and marked with repetitious series of numbers 0, 10, 20, etc. up to 90. For convenience, the scale numbers run in both directions. By setting a 0 mark at the starting point 36, when attaching the tape, the distance of every landmark along the course therefrom is measured and indicated by the tape.

When starting his flight, the pilot rotates the knurled boss 43 on the dial 3 to set 0 miles at the indicator arrow 20 (the friction of the rubber tire 13 against the disk 12 is sufficiently slight to readily permit this) and rotates the dial 2 on wheel 17 to the ground speed he expects to maintain. When he passes the first recognizable landmark on his flight, he checks his ground miles at 20 against the distance as shown by the tape 38 on the chart 35. If incorrect, say too great, he resets the dial 3 to the correct distance, and at the same time, resets the dial 2 to the correct ground speed, as indicated by the time it has taken him to cover the known distance between the starting point and the first landmark. Then, at his next landmark, he checks the reading of the dial 3 against the tape 38 and chart 35, repeating the previous procedure, if necessary, but usually by the second or at most the third landmark, he has the meter properly coordinated with his actual speed and distance. Thereafter, so long as his compass course is correct, and, weather and wind conditions remain constant, the reading of the dial 3 shows him just where he is on the chart 35 by checking with the tape 38, and he does not have to devote his entire attention to picking up every landmark or check point along his course, and instead, may relax and enjoy his flight, making only occasional references to the meter, chart and compass. It is thus obviously quite easy to adjust the meter so that the reading on the "ground miles" dial 3 will conform to the reading on the tape and chart. Once set, the meter indicates the miles traveled and ready reference to the chart indicates the location on course. When the meter is synchronized with the tape, the "ground speed" dial 2 indicates in miles per hour the actual ground speed of the airplane.

Figure 6:
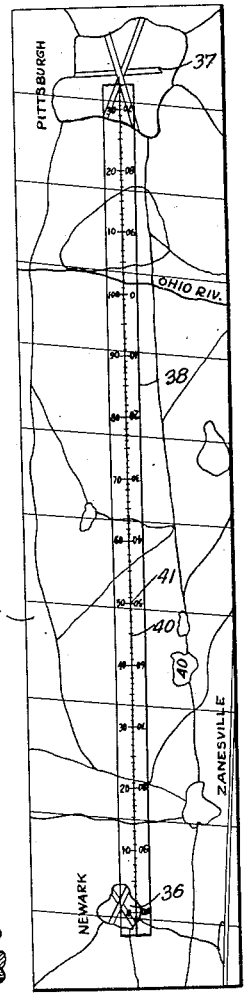
Figure 6 is an elevational view of an aeronautical chart and navigation tape which is used together as a system with the navigation meter.

The same chart may be used on the return trip. As shown in Fig. 6, the original destination, Pittsburgh, at 37 is about 135 miles from Newark, Ohio, hence there will be the scale distance of 35 at Pittsburgh, and likewise the reverse scale distance 65 for use in the opposite direction. Hence, in traveling on the return trip, the pilot sets the navigation meter so that 65 miles appears at the indicator arrow 20. The meter will then indicate a reading corresponding to the return scale on the tape 38 and will continue back to the original starting point, Newark, as long as the meter is properly coordinated with the tape.

It is possible that various changes and modifications may be made in my invention without departing from the spirit and scope thereof, and I do not wish to be understood as limiting myself to the specific construction nor the specific uses therein described.

Having thus set forth and disclosed this invention, what is claimed is:

In a navigation meter for aircraft comprising coordinated ground speed and elapsed ground distance indicating dials and having a clock mechanism; a variable speed transmission including a pair of spaced disks having concentric annular surfaces adjacent each other defining a torus, a roller, of a diameter substantially equal to the diameter of the generating circle of the torus defined between said disks, having a frictional peripheral surface in contact with said disks, spring means urging said disks against the peripheral surface of said roller, the center of said roller being at the center of the torus diameter, means for mounting said roller for rotation about a diameter extending parallel to the plane of the torus diameter between said disks and tangent thereto, and control means geared to said mounting means, said roller mounting means comprising a stub staft on which said roller is journaled, a longitudinally slotted shaft across the slot of which said stub shaft extends, said slotted shaft being pivotally mounted for rotation about its axis, the axis of said slotted shaft coinciding with said aforesaid roller diameter, said control means comprising a knurled wheel, a control pinion concentric with said knurled wheel and keyed thereto, an idler gear in mesh with said control pinion, a gear sector in mesh with said idler gear, said gear section being keyed to said slotted shaft, said knurled wheel having an annular slot extending less than a complete circle, one end of said slotted shaft extending into said annular slot to limit the rotation of said knurled wheel and thus of said slotted shaft and roller.

WARREN G. GRIMES.

REFERENCES CITED

The following references are of record in the file of this patent:

UNITED STATES PATENTS

| Number | Name | Date |
| --- | --- | --- |
| 197,472 | Hunt | Nov. 27, 1877 |
| 671,662 | White | Apr. 9, 1901 |
| 1,883,565 | Christiansen | Oct. 18, 1932 |
| 2,294,165 | Elms | Aug. 25, 1942 |

FOREIGN PATENTS

| Number | Country | Date |
| --- | --- | --- |
| 449,496 | Great Britain | June 29, 1936 |